Dec. 12, 1939.                H. H. FRANCK ET AL                2,183,379
PROCESS FOR PRODUCING A PHOSPHATIC FERTILIZER SOLUBLE IN CITRIC ACID
                            Filed July 29, 1936

Inventors
Hans Heinrich Franck &
Franz Joseph Kaess
BY *Munn, Anderson & Liddy*
Attorneys Patented Dec. 12, 1939

2,183,379

UNITED STATES PATENT OFFICE 2,183,379

PROCESS FOR PRODUCING A PHOSPHATIC FERTILIZER SOLUBLE IN CITRIC ACID

Hans Heinrich Franck, Berlin-Charlottenburg, and Franz Joseph Kaess, Neubabelsberg, Germany, assignors to Bayerische Stickstoff-Werke Actiengesellschaft, Berlin, Germany, a joint-stock company of Germany Application July 29, 1936, Serial No. 93,202
In Germany August 3, 1935

1 Claim. (Cl. 71—44)

This invention relates to the production of phosphatic fertilizers soluble in citric acid.

Processes are known for producing phosphatic fertilizers from raw phosphate without using alkali metal compounds by heating the starting materials, in presence of silicic acid and steam, to temperatures exceeding 1300° C., whereby either $\alpha$-tricalcium phosphate or a calcium-meta-silico-orthophosphate is formed depending upon the proportions of lime and silicic acid actually used.

When recovering the $\alpha$-tricalcium phosphate care must be taken that on cooling down no insoluble $\beta$-tricalcium phosphate be re-formed.

In practically carrying out the process, for instance, in a rotary tube furnace, the difficulty arose that the material stuck to the walls of the furnace when employing the optimum disintegrating temperatures of about 1425° C. to 1500° C. (The term "disintegrate" as used in this specification means "to render the phosphate available".) The cause of this sticking to the walls was found to be that during the disintegrating operation an eutectic, viz. apatite+$\alpha$-tricalcium phosphate (+contaminations) was formed of which the softening-point, for instance, of a 75% Florida phosphate lies at about 1415° C. Therefore, in order to be able to carry out the calcination process continuously, the temperature must be kept below this softening point.

Maintaining these lower temperatures entails the disadvantage of greatly prolonging the operation. Now we have found that this difficulty can be eliminated by carrying through the calcining process in two or more separate stages of temperature. These temperatures must exceed 1300° C.; at least the second and the possibly following stages should surpass the eutectic temperature. The first stage is preferably kept below the softening-temperature and is maintained until the outer portions of the phosphatic grains are disintegrated by about 50% wherewith the eutectic composition of these layers is surmounted and the risk of sticking when proceeding to higher temperatures is avoided. The subsequent stage or stages may then be effectuated at the optimum temperature of disintegration so as to avoid sticking. By suitably controlling the temperatures the first stage also may be temporarily kept above the eutectic temperature.

This two-stage process may be carried out in two separate rotary furnaces. However both working stages may be combined in one rotary tube furnace, for instance, by contracting or narrowing the interior of the furnace at a certain place so that the material is rapidly conveyed close to the hot flame when passing through the narrower portion. The material goes through the first stage of temperature in the wider portion and thereafter through the second stage of temperature in the narrower portion of the furnace. By correspondingly lengthening or shortening these zones or by approaching the flame more closely to the material under treatment the transport of the material may be conformed to the temperature curve of the pertinent softening-diagram.

In the annexed drawing some constructions of furnaces are shown in which this adaptation of transporting the material and controlling the temperatures to the softening-diagram is obtained either by a special form of the furnace or by providing two furnaces and controlling the gas current correspondingly.

Above each furnace the pertinent diagram is designed indicating in dot-and-dash lines the course of the softening temperatures, determined for the material used, whereas for the material to be treated in the furnace the heating curve conformed to this softening-diagram is drawn in full lines. The softening-diagram was ascertained either by the "Seger Cone" method or in the following way:

A pill of the material was put on a fissure of a platinum cup and heated. The temperature at which the pill began to glide through the fissure was designated as the softening-point. This method of ascertaining the softening-point comes nearest to the conditions prevailing in the furnace, as for the phenomenon of the material sticking on the walls the softening of the outermost layer of material is decisive. It is to be noted that the softening of the outer layer of material also to a certain degree depends upon the size of the grain.

Figure 1:
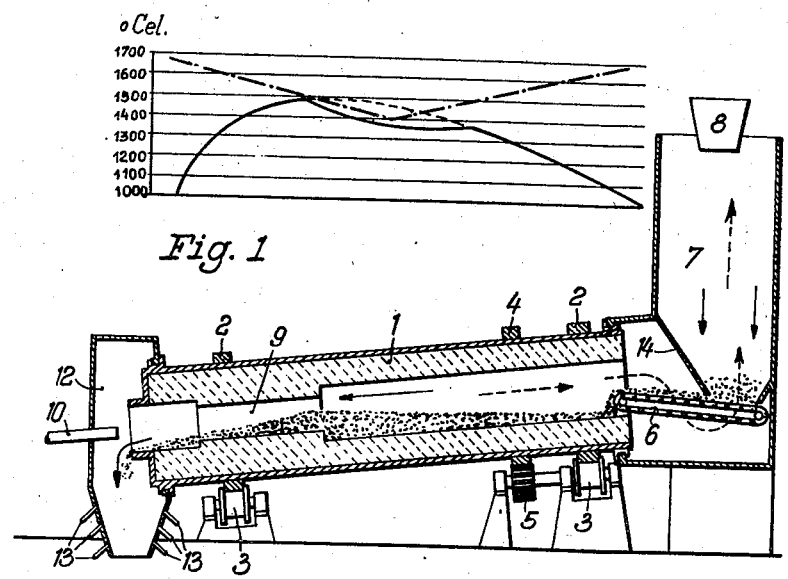
Fig. 1 is a longitudinal cross-section of a single furnace for carrying out the invention.

The furnace shown in Fig. 1 is a single countercurrent furnace and consists of the tube proper 1 which is rotatably mounted on rolls 3 by means of traveling rings 2 and may be rotated by cog wheels 4, 5 in the usual way. The rotary tube is charged with the material to be treated by a traveling grate 6 the outer end of which is located beneath a charging chamber 7 into which the material is introduced by a hopper 8.

The rotary tube is provided with a contraction 9 in which the second stage of the heating takes place. The heating of the rotary tube is effected by the burner 10. The completely heated material is discharged into a chamber 12 where it is quickly cooled down by injecting water through nozzles 13. The material is passed through the furnace plant in the direction of the arrows drawn in full lines, whereas the heating gases inflow in the opposite direction as indicated by dotted arrows. The gases pass by the rotary tube 1 and are from here directed downwards by a partition 14 so as to pass through the material supplied on the grate 6. From the underside of the grate 6 they are passed again upwards to the charging chamber 7. Thus they serve all the way for heating or preheating the material.

Above the furnace the diagram of temperature and softening is designed. It appears that the diagram of temperature shows for the narrower portion of the furnace a downwardly directed deviation so that the softening-curve is not surpassed anywhere. The diagram of temperature in a normal furnace without contraction is indicated by the dotted continuation from which it appears that in such a furnace the material would surpass the eutectic temperature and thereby sticking would be produced.

Figure 2:
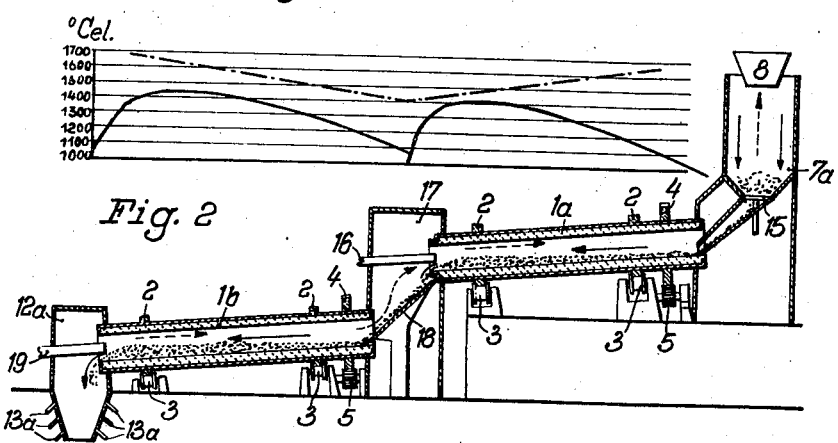
Fig. 2 is a similar view of a plant comprising two furnaces connected in series, both furnaces working on the countercurrent principle.

In the modification shown in Fig. 2 two normal rotary tube furnaces are connected in series, both of them being worked in countercurrent. The first rotary tube is charged from the chamber 7a, the supply of material being adjusted by a controlling member 15. Heating is effected by a burner 16. The rotary tube 1a conveys the material into a chamber 17 in which it reaches over a chute 18 the second rotary tube 1b. This is passed by the material which then drops into the chamber 12a where it is cooled down by a spray of water ejected from nozzles 13a. The heating of the rotary tube 1b is effected by a burner 19.

The material is again conveyed in the direction of the full line arrows, whereas the heating gas flows in the direction of the dotted line arrows. It appears from the diagram of temperature and softening designed above the furnace that the highest temperatures are reached at the end of each furnace and that these temperatures nowhere reach the softening temperature.

Figure 3:
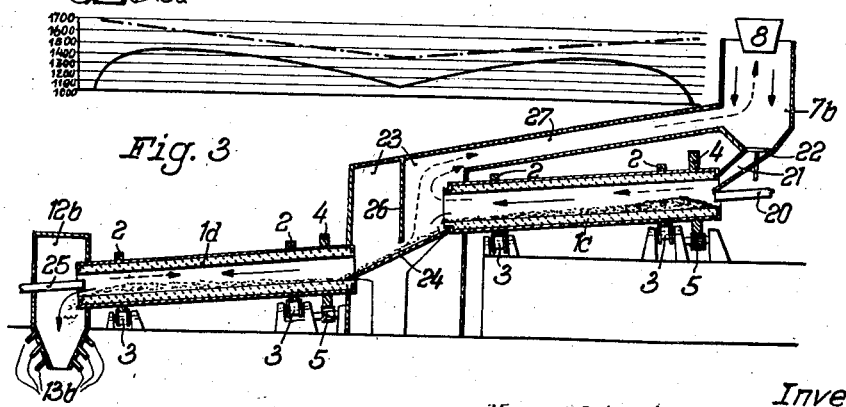
Fig. 3 is a cross-sectional view of a similar plant, only the second furnace working on the countercurrent principle.

In the modification shown in Fig. 3 the first rotary tube 1c works with currents flowing in the same direction and the second rotary tube 1d works with countercurrent. The rotary tube 1c is heated by the burner 20 and the material is conveyed to the rotary tube 1c from the chamber 7b over a chute 21 and a control member 22. At the other end the material is delivered into a chamber 23 and is conveyed over a chute 24 to the second rotary tube 1d. After having passed the latter it arrives in the chamber 12b where it is chilled by water from the nozzles 13b. The heating of the second rotary tube is effected in the direction of the full line arrows, the heating gases following the dotted arrows. In order to cause the heating gases to come in contact with the material passing over the chute 24, a baffle plate 26 is arranged in the chamber 23. The heating and the waste gases leaving the rotary tubes 1c and 1d are conducted through a separate channel 27 to the chamber 7b.

From the diagram of temperature and softening designed above the furnace it appears that in the first furnace the highest temperature is obtained in the beginning and in the second furnace at the end and that in this case the control of the temperature adapts itself to the softening diagram in the best and most advantageous manner.

Each furnace was 4 feet long and its inner diameter was 4 inches. In each case 300 to 500 grams of 75% Florida Pebble phosphate having a size of grain of 1 to 3 m. m. were employed. In order to obtain a material of a composition as uniform as possible the material is preferably first finely ground and thereafter, with the addition of water if desired, granulated to the desired size of grain.

The following examples were carried out in the furnaces:

*Example 1.*—The material was passed within 3 hours through a normal rotary tube furnace of which the heating zone showed a temperature of from 1420° C. to 1440° C. The material was disintegrated during this period by 95%, but stuck to the walls so that it was necessary to stop the continuous work. In a parallel experiment the material was passed through a furnace plant arranged as in Fig. 2, the highest temperature obtained in the first furnace amounting to 1410° C. The material was disintegrated by 50% to 60%. It was conveyed to the second furnace where it was disintegrated within one hour at a temperature up to 1430° C. by 95% to 100%. No sticking took place in both furnaces. Thus by subdividing the process into two stages continuous working was made possible and complete disintegration was obtained in a shorter time.

*Example 2.*—The trial was carried out in the same manner as in Example 1, except that in the first furnace a lower temperature of 1390°-C. to 1400° C. was maintained so that the material was only disintegrated by 30% within one hour. Nevertheless this intermediate product could be further disintegrated by 85% in the second furnace within one further hour at 1430° C. to 1440° C.

*Example 3.*—The material was treated in a common rotary tube furnace without contraction at a temperature of from 1380° C. to 1400° C., i. e. a temperature below the fusing point of the eutectic materials. The final product was not sticky, but 4 hours were required for disintegrating it by 80% to 85%.

*Example 4.*—In a furnace having a contracted zone as shown in Fig. 1 the starting material was heated in the wider portion to 1380° C.—1400° C. The material remained in this zone for about 85 minutes. Then it passed to the contracted zone the temperature of which amounted to 1420° C.—1430° C. In this zone the material stayed for about 35 minutes. The final product was disintegrated by 80% and was quite loose so that the continuous work was not troubled by sticking.

*Example 5.*—The process was carried out in accordance with Example 4. Samples taken from the first zone proved that the material when entering the contraction was disintegrated by 40% to 45%. In the contracted zone the temperature was elevated to 1430° C.—1440° whereby a disintegration up to 90% was obtained.

*Example 6.*—In an aggregate of furnaces as shown in Fig. 3 a flame temperature of 1600° C. was used in the first furnace corresponding to a highest temperature of the material of 1480° C. in the first part of the furnace. The material was conveyed through the furnace within half an hour and was disintegrated during this period by 32.5%. At the end of the second furnace the same conditions prevailed as in the first furnace with the exception that in the second furnace the burning gases and the material were conducted in opposite directions. After a two and a half hour's treatment in the second furnace the material was disintegrated by 100%.

The examples show that by subdividing the process into stages according to the invention sticking is avoided and the material can be disintegrated in a very short time, although temperatures above the fusing point of the eutectic materials are employed.

The steam concentration in the furnace must at least suffice for converting the fluorine content of the fluorapatites into hydrofluoric acid. Preferably oil or gas burners are used the flames of which produce the required steam concentration.

The process may be carried out with a starting material to which slight quantities of alkali metal compounds such as alkali metal carbonates or sulfates are added.

We claim:

The process of rendering crude phosphate rock citrate soluble by removal of fluorine therefrom which comprises continuously feeding phosphate rock in the form of grains into a confined space, heating the grains by a current of hot gases passing in the same direction in the presence of water vapor and silica for a period sufficient only to effect a partial conversion of not more than 50% of the phosphate rock, scaling down the temperature to well below fusion of the eutectic composed of apatite, alpha tricalcium phosphate and impurities which form at the end of this heating stage, feeding the grains partly converted through a second confined space and thereupon again gradually increasing the temperature to above 1400° C. by conducting hot gases through said space countercurrent to the flow of the phosphate grains to complete the conversion, the temperature at all times being maintained above 1300° C. but below the softening point of the particular phosphate rock composition found at any stage of the heat treatment.

HANS HEINRICH FRANCK.
FRANZ JOSEPH KAESS.